United States Patent

Erickson et al.

[11] 4,020,395
[45] Apr. 26, 1977

[54] TRANSIENT VOLTAGE PROTECTION CIRCUIT FOR A DC POWER SUPPLY

[75] Inventors: John M. Erickson, Ocean; Theodore Redgate, Brielle, both of N.J.

[73] Assignee: The United States of America as represented by the Secretary of the Army, Washington, D.C.

[22] Filed: Sept. 17, 1975

[21] Appl. No.: 614,272

[52] U.S. Cl. .................. 361/59; 361/86; 361/111
[51] Int. Cl.² ........................... H02H 3/22
[58] Field of Search ........ 317/31, 22, 33 SC, 50; 323/9

[56] References Cited

UNITED STATES PATENTS

| | | | |
|---|---|---|---|
| 3,543,091 | 11/1970 | Marek | 317/31 X |
| 3,571,608 | 3/1971 | Hurd | 317/31 X |
| 3,579,039 | 5/1971 | Damon | 317/50 X |
| 3,956,661 | 5/1976 | Sakamoto et al. | 323/9 X |

Primary Examiner—Harry E. Moose, Jr.
Attorney, Agent, or Firm—Nathan Edelberg; Jeremiah G. Murray; Edward Goldberg

[57] ABSTRACT

A protection circuit for a DC power supply which protects the power supply and its load against transient over voltages which may exist at the input to the power supply. The device also includes circuitry for protection of the power supply elements against short circuiting due to load failure. The circuit provides rapid and positive disconnect at the power supply input when a transient overvoltage is impressed, and an effective shut down of the entire power supply in the event of a short-circuit load. The device includes a transient voltage sensor network connected to a temperature stabilized powerload disconnect switch utilizing semi-conductive elements capable of extremely high switching speeds. The circuit switching is sufficiently fast such that the load operation and performance is not noticeably affected in the presence of fast transients impressed at the input to the power supply. Power dissipation in the device is confined to extremely fast turn on and turn off switching losses and saturation losses.

7 Claims, 2 Drawing Figures

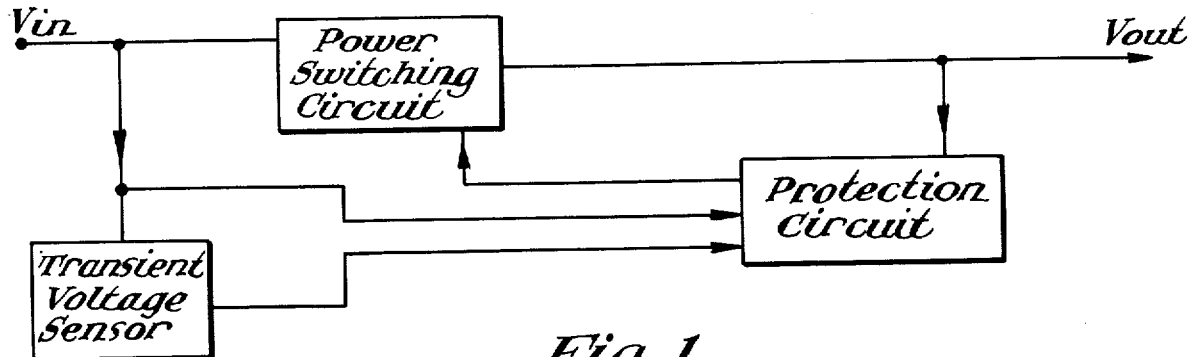
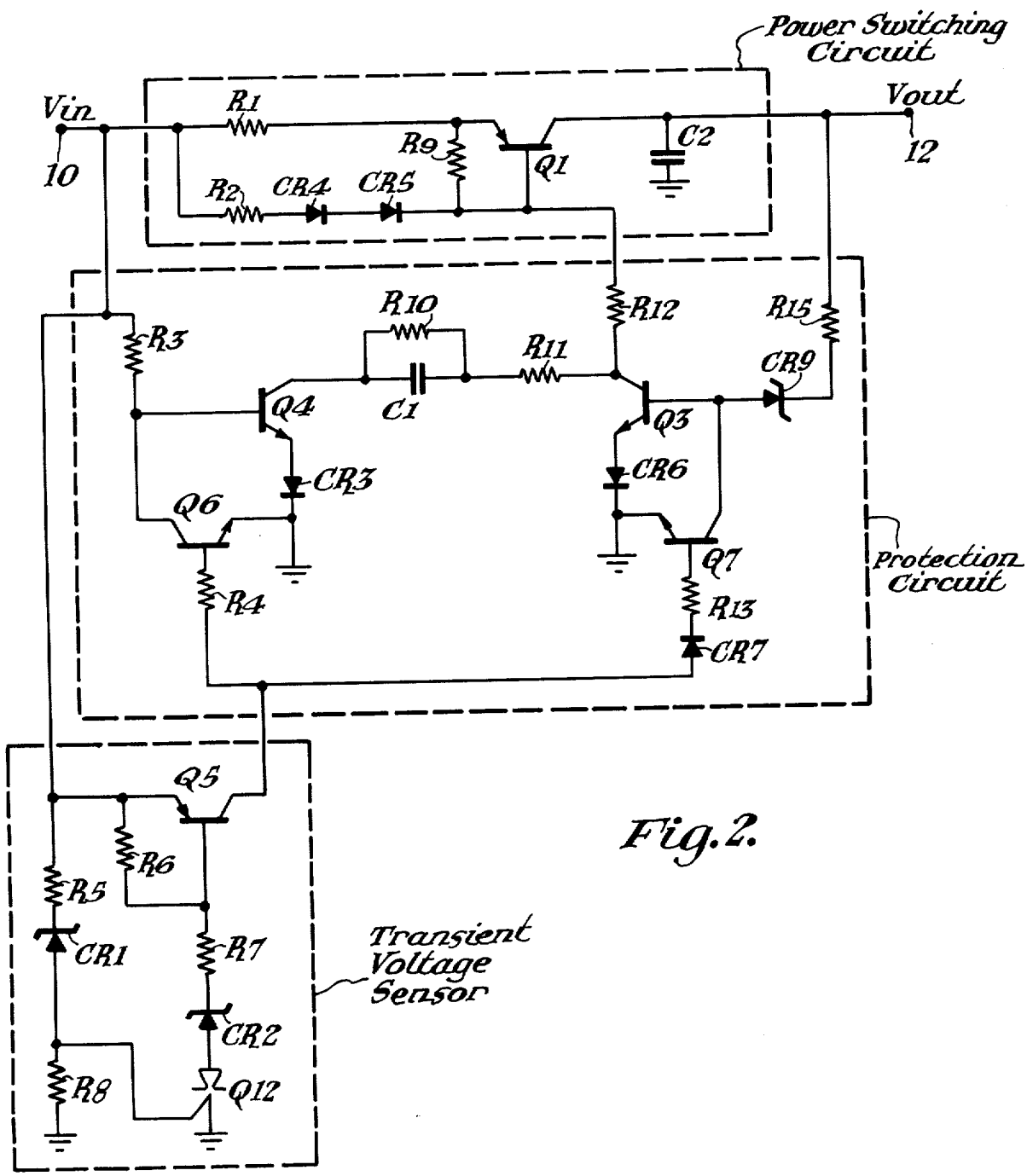
Fig. 1.
Fig. 2.

TRANSIENT VOLTAGE PROTECTION CIRCUIT FOR A DC POWER SUPPLY

The invention described herein may be manufactured and used by or for the Government for governmental purposes without the payment of any royalties thereon or therefor.

BACKGROUND OF THE INVENTION

This invention relates generally to an improved DC power supply which is coupled to a load having sensitive circuit elements, such as a radio or the like, and specifically to an improved transient overvoltage protection circuit utilized with a conventional DC power supply which acts to protect both the power supply elements and the load from overvoltages which may occur from transient electrical signals existing in the area adjacent the power supply. Oftentimes, when driving a load with a conventional DC power supply, transient electrical signals generated by an exterior source can be impressed in the power supply circuitry causing momentary but extremely large overvoltages on the power supply system and any load attached thereto, resulting in damage to either the power supply elements or the load or both. Sensitive semi-conductor elements downstream of the conventional DC power supply are often damaged from such transient signals, which require replacement in the load. Mutual coupling from adjacent circuits or the switching of adjacent electrical equipment (on or off) are examples of how transient signals can be induced into the DC power supply line. An example of a problem area in the past is found in the use of radio equipment in an aircraft or other vehicles having several electrical devices housed in compact areas. A secondary problem with a DC power supply has been that if the load, such as a radio, develops a short circuit, the DC power supply can be damaged.

The instant invention provides a protection circuit for a conventional DC power supply which protects both the DC power supply and the load against either transient overvoltages which may be induced into the DC power supply line or a short-circuit experienced in the load itself. The instant invention is characterized by having extremely positive and fast switching which provides a rapid and positive disconnect of the load from the power supply input when a transient overvoltage is impressed. The protection circuit includes a temperature compensated power supply disconnect switching network which stabilizes the current limit threshold.

BRIEF DESCRIPTION OF THE INVENTION

A protection circuit for a DC power supply for protecting the power supply and a load coupled thereto against transient overvoltages or a load short-circuit comprising an input circuit means for receiving a DC voltage, an output circuit means connectable to a load, a transient voltage sensing means, and a current gate connected between said input means and said output means and coupled to said transient voltage sensing means whereby when a particular voltage magnitude is reached in said voltage sensing means, said current gate will be made non-conductive, momentarily disengaging the power supply from the load. The device includes circuit elements for temperature stabilizing the current gate and capacitive means for maintaining an operating voltage to the load during the brief and instantaneous period when the power supply is shut off relative to the load. Additionally for protection against a short circuit in the load, a switching means which senses a voltage drop of a predetermined magnitude across the output is connected to the load which likewise turns the current gate off when the output voltage falls below a particular level. After the short-circuit in the load has been repaired, power to the load may be restored by interrupting momentarily the voltage input. Abrupt re-application of the input voltage causes the current gate to conduct.

The transient voltage sensor in one embodiment includes an SCR coupled to a network of transistors. The SCR, when triggered, switches on all the transistors in the network, which act in concert to shut off the power supply gate momentarily. A low voltage detector senses when the input voltage falls below a predetermined level which acts to charge a capacitive means through the power gate causing the gate to conduct and latch the gate in an "on" condition, restoring power to the load. The switching of the main gate between conductive and non-conductive states is extremely abrupt such that the transistor is either fully conducting or fully non-conductive when the input voltage is just above or below the threshold voltage of a switching element in the transient voltage sensor. Thus power dissipation in the main power gate transistor is confined to fast turn on and turn off switching losses and saturation losses.

It is an object of this invention to provide a protection circuit for safeguarding semi-conductors utilized in a load which is coupled to a DC power supply.

It is another object of this invention to provide a protective circuit which protects a DC power supply and load from current load conditions and transient overvoltage respectively.

But yet another object of this invention is to provide a voltage and current protection circuit utilized with a DC power supply which is characterized by having positive, extremely fast switching obtained at the levels of operating voltage for disconnecting the supply voltage to protect the load and the DC power supply equipment.

And yet still another object of this invention is to provide a current sensitive circuit which protects the power supply equipment from short circuits in the load. After the short circuit in the load is repaired, the system may be quickly brought back on the line by a momentary power interruption to the input of the protection circuit.

In accordance with these and other objects which will be apparent hereinafter, the instant invention will now be described with particular reference to the accompanying drawings.

BRIEF DESCRIPTION OF THE DRAWINGS

FIG. 1 shows a schematic block diagram of the instant invention.

FIG. 2 shows a schematic diagram of the instant invention as utilized between a DC power supply and a load.

PREFERRED EMBODIMENT OF THE INVENTION

Referring now to the drawings and especially FIG. 1, a block diagram of the instant invention is shown as might be utilized with a conventional load such as a radio found in an aircraft or other vehicles. A conventional DC power supply input Vin is coupled to a voltage suppressor which protects the entire circuit and load from extreme overvoltage. The input Vin is also coupled to a power switching circuit which couples the DC voltage input to the load through a power supply gate. Coupled to the power supply gate is a protection circuit constructed in accordance with the instant invention which includes a transient voltage sensor connected to the DC power supply input and the protection circuit itself. The output Vout represents the voltage output to an output load, such as a radio.

In the basic operation, to prevent transient overvoltage from damaging the load, any random or spurious overvoltage of a predetermined magnitude is sensed by the transient voltage sensor which triggers the protection circuit, causing it to react by momentarily shutting off power to the load by making the power switching circuit non-conductive. When the voltage level across the supply output drops to a predetermined level, the circuit provides a means (not shown in FIG. 1) for restoring the power to the load gate to a conductive state.

FIG. 2 shows the circuit elements of the instant invention which includes a main power supply gate Q1 coupled between the voltage input 10 from a DC power supply (not shown) and the output 12. The gate is a transistor Q1 which when conducting provides DC current to the output load. Transient overvoltage sensing is accomplished by a Zener diode rectifier CR1 which is connected to SCR Q12 and Zener diode CR2 and includes a plurality of resistors R5, R6, R7 and R8 connected at the base and emitter of the transistor Q5. Transistors Q3, Q4, Q6 and Q7 are coupled together in a network including capacitor C1 which act, when conducting, to effectively and positively switch transistor Q1 to a non-conductive state, the operation of which is described below. Resistor R2 in conjunction with diodes CR4 and CR5 act as a temperature stabilizer for the switch Q1. At elevated ambient temperatures, there is a tendency for the Q1 base current to divert through R2, CR4 and CR5, increasing the saturation voltage magnitude and lowering the current limit setting. The base current diversion is largely eliminated by the compensating voltage drop across R2.

The instant invention includes elements to protect the power supply from any short-circuit in the output load. A Zener diode CR9 coupled to Q3 and the output load through resistor R15 senses a low voltage output at Vout which would result from a short-circuit in the load.

In operation, the voltage received at element 10 provides load operating current through switch Q1 (which is normally conductive). If a transient signal induces a large over-voltage in the power supply circuit, the transient overvoltage will be sensed by back biasing CR1 which triggers Q12 turning on Q5, Q6 and Q7. Transistor Q7, when conductive, shuts off transistor Q3 which makes transistor Q1 non-conductive, causing the output voltage to the load from the protection circuit to decay. When the input voltage falls below the biasing voltage of CR2, insufficient holding current causes Q12 to become non-conductive. Transistor Q4 becomes conductive charging capacitor C1 through Q1. C1 provides a pulsed output voltage through CR9 to Q3 which turns on Q3 causing Q1 to latch. Capacitor C2 has a relatively large magnitude such that the output voltage to the load does not experience any significant increase in voltage prior to transient voltage cut-off of transistor Q1. The circuit provides for a very rapid turning off of the main power switch with a rapid turn on based on voltage limits of the system at the input.

A short-circuit in the load causing the output voltage to fall below the Zener diode voltage of CR9 acts to turn off Q1 and Q3, thus protecting the DC power supply circuit elements from a short-circuit condition existing in the load itself. Once the short-circuit has been corrected in the load, power to the load may be restored by momentarily switching the power off and then on again which makes the main power switch conductive by charging capacitor C1. Build up of the output voltage conducts current into the base of transistor Q3 via Zener CR9, thus Q1 is latched on.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. A protective circuit for use with a DC power supply and a load which provides for rapid disconnection of the power supply and the load whenever transient overvoltages are impressed in the power supply circuit comprising:
   input means connectable to the DC power supply output;
   output supply voltage means connectable to a load;
   gating means connected between said input means and said output means, said gating means having conductive and non-conductive states;
   control means connected between said input and output means and to said gating means for switching said gating means from the conductive to the non-conductive state; and
   transient voltage sensing means connected to said input means and to said control means, said transient voltage sensing means including switching means connected between said input and control means for causing said control means to switch said gating means to said non-conductive state whenever a transient voltage over a predetermined threshold is sensed whereby the non-conductive state of said gating means disconnects the power supply from the load, and for causing said control means to switch said gating means to said conductive state upon sensing a transient voltage less than said threshold to reconnect the power supply to the load, and further including first means for sensing said transient voltage over said threshold and second means for sensing said transient voltage less than said threshold.

2. The protective circuit, as in claim 1, including: means connected to said output means and to said control means for sensing a short-circuit across said output means and causing said control means to switch said gating means to said non-conductive state.

3. The protective circuit, as in claim 1, including: means connected to said input means and said gating means for stabilizing current limit threshold relative to ambient temperature, said temperature stabilizing means including a resistive means and a rectifying means connected to said resistive means.

4. The protective circuit, as in claim 1, wherein said control means includes capacitive means connected between said input means and said gating means for latching said gating means in said conductive state when said second means senses said transient voltage less than said threshold.

5. The protective circuit, as in claim 4, including: means connected to said output means and said control means for sensing a short-circuit across said output means, said short-circuit sensing means including means for causing said control means to switch said gating means to said non-conductive state whenever a short-circuit is sensed.

6. The protective circuit of claim 1 wherein said switching means includes a switching transistor, said first means for sensing said transient voltage includes a first zener diode, and said second means for sensing said transient voltage includes a second zener diode.

7. The protective circuit of claim 6 including a silicon controlled rectifier connected to said zener diodes and said switching transistor.

* * * * *